United States Patent
Wallace et al.

(10) Patent No.: US 8,427,482 B2
(45) Date of Patent: Apr. 23, 2013

(54) CONNECTED AND OVERLAPPED SHAPES ENHANCEMENTS

(75) Inventors: Erin Wallace, Calgary (CA); Andy Leung, Calgary (CA)

(73) Assignee: SMART Technologies ULC (CA)

( * ) Notice: Subject to any disclaimer, the term of this patent is extended or adjusted under 35 U.S.C. 154(b) by 0 days.

(21) Appl. No.: 13/278,855

(22) Filed: Oct. 21, 2011

(65) Prior Publication Data

US 2012/0098858 A1    Apr. 26, 2012

Related U.S. Application Data

(60) Continuation of application No. 11/853,160, filed on Sep. 11, 2007, now abandoned, which is a division of application No. 10/775,824, filed on Feb. 9, 2004, now abandoned.

(60) Provisional application No. 60/445,625, filed on Feb. 7, 2003.

(51) Int. Cl.
*G09G 5/00* (2006.01)
*G06T 11/20* (2006.01)

(52) U.S. Cl.
USPC ............ 345/441; 345/442; 345/619; 345/629

(58) Field of Classification Search .................. 345/619, 345/629, 440–441, 442
See application file for complete search history.

(56) References Cited

U.S. PATENT DOCUMENTS

| | | | |
|---|---|---|---|
| 5,231,695 A | 7/1993 | Harrington | |
| 5,675,753 A | 10/1997 | Hansen et al. | |
| 5,745,122 A | 4/1998 | Gay et al. | |
| 5,831,632 A | 11/1998 | Schuster et al. | |
| 7,253,823 B2 | 8/2007 | Wong et al. | |
| 7,468,727 B2 | 12/2008 | Wong et al. | |
| 2010/0313153 A1 | 12/2010 | Jaeger | |
| 2012/0127178 A1* | 5/2012 | Wong et al. | ................... 345/440 |

OTHER PUBLICATIONS

Nov. 27, 2007 Office Action for U.S. Appl. No. 10/775,824.
Feb. 27, 2007 Office Action for U.S. Appl. No. 10/775,824.
Feb. 3, 2009 Office Action for U.S. Appl. No. 11/852,806.

* cited by examiner

*Primary Examiner* — Chante Harrison
(74) *Attorney, Agent, or Firm* — Katten Muchin Rosenman LLP

(57) ABSTRACT

A method of ordering visual objects presented on a display includes comparing visual objects to be placed in an overlapping condition and determining from the comparison the order in which the visual objects are to be placed. The visual objects are re-ordered and placed in the overlapping condition in accordance with the determination. Methods of creating connecting links joining source and destination visual objects as well as overlapping object and object-connecting tools are also provided.

25 Claims, 17 Drawing Sheets

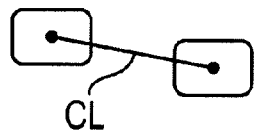 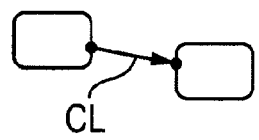 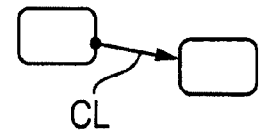
FIG. 8a  FIG. 8b  FIG. 8c
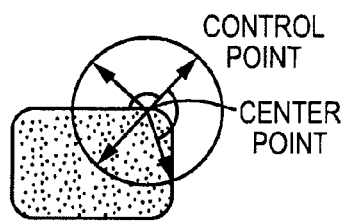
FIG. 9
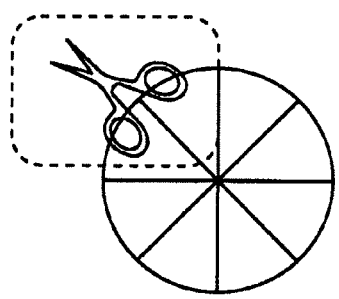 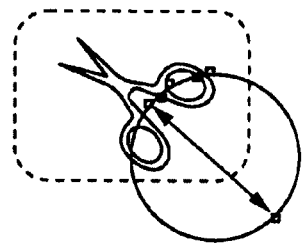
FIG. 10  FIG. 11

BEFORE

AFTER

BEFORE

AFTER 0  90  180  270

UPPER LEFT CORNER

PATHS CLEARED OF SNOW FROM
BUILDING ONE TO BUILDING TWO

CONNECTED AND OVERLAPPED SHAPES ENHANCEMENTS

CROSS-RELATED APPLICATION

The present application is a continuation of U.S. patent application Ser. No. 11/853,160, filed Sep. 11, 2007, which is a divisional of U.S. patent application Ser. No. 10/775,824, filed Feb. 9, 2004, now abandoned, which claims the benefit of U.S. Provisional Patent Application No. 60/445,625 filed on Feb. 7, 2003, the contents of all incorporated herein by reference.

FIELD OF THE INVENTION

The present invention relates generally to diagramming and more particularly to methods of creating and manipulating diagrams and to diagramming tools for creating and manipulating diagrams.

BACKGROUND OF THE INVENTION

Computer software programs that allow a user to create diagrams including linked visual objects are well known in the art. To-date, these computer software programs have been limited, allowing users to create diagrams that only include visual objects of simple shape, linked with lines and laid out in a two-dimensional plane without overlap. The simple shapes of visual objects available to users have typically included rectangles, ellipses and simple polygons. In many instances, these computer software programs statically attach arrows between linked visual objects or draw lines between linked visual objects without arrows. Although these computer software programs have proven to be useful, a need exists for diagramming tools that enable a user to create enhanced diagrams.

It is therefore an object of the present invention to provide novel methods of creating and manipulating diagrams and diagramming tools for creating and manipulating diagrams.

SUMMARY OF THE INVENTION

Accordingly, in one aspect of the present invention there is provided a method of ordering visual objects presented on a display comprising:

comparing visual objects to be placed in an overlapping condition;

determining from the comparison the order in which said visual objects are to be placed; and re-ordering and placing the visual objects in said overlapping condition in accordance with said determination.

In one embodiment, during the comparing, a metric of each visual object is compared to determine a relative size of each visual object. During the determining, visual objects are placed in order from smallest to largest with smaller visual objects being places in front of larger visual objects. The metric may be the area of a rectangular region surrounding each visual object.

In one embodiment, the comparing, determining and re-ordering are performed automatically when a visual object is brought into an overlapping condition with another visual object during visual object manipulation. In another embodiment, the comparing, determining and re-ordering are performed automatically when a visual object is brought into an overlapping condition with another visual object during visual object manipulation and then released. In still yet another embodiment, the comparing, determining and re-ordering are performed in response to a user input command.

According to another aspect of the present invention there is provided a method of creating a connecting link between source and destination visual objects comprising:

determining a region within each visual object to be joined and a connecting path extending between the regions;

clipping the connecting path so that the connecting path terminates at the locations where the connecting path intersects the source and destination visual objects; and extending a connecting link between the source and destination visual objects terminating at said locations.

In one embodiment, the region is a point within the each visual object and specifically, the center of each visual object. When the connecting path is a straight line, during the clipping, the straight line is traversed to determine the locations where the connecting path intersects the source and destination visual objects. When the connecting path is a curved line, during the clipping, the curved line is flattened and represented by a series of straight line segments. Each straight line segment is traversed to determine the locations where the connecting path intersects the source and destination visual objects. When the connecting path is a self-loop, during the clipping the self-loop is traversed in clockwise and anti-clockwise directions to determine the locations where the connecting path intersects the source and destination visual objects.

Arrowheads may be provided at one or both ends of the connecting link. When an arrowhead is placed at the end of a connecting link, the tip of the arrowhead terminates at the location and the connecting link terminates at the backend of the arrowhead.

The connecting link may be represented by a plurality of space shapes. The spaced shapes are typically generally evenly spaced along the length of the connecting path. The shapes along the connecting path may be the same or different. The shapes provide semantic meaning to the connecting link joining visual objects.

According to yet another aspect of the present invention there is provided a method of creating a connecting link joining source and destination visual objects comprising:

determining a path for said connecting link between said source and destination visual objects; and representing said connecting link by at least one non-line shape.

According to still yet another aspect of the present invention there is provided an overlapping object tool for ordering visual objects presented on a display comprising:

means for comparing visual objects to be placed in an overlapping condition;

means for determining the order in which said visual objects are to be placed based on said comparison; and means for re-ordering and placing the visual objects in said overlapping condition in accordance with said determination.

According to still yet another aspect of the present invention there is provided an object-connecting tool for creating a connecting link between source and destination visual objects comprising:

means for determining a region within each visual object to be joined and a connecting path extending between the regions;

means for clipping the connecting path so that the connecting path terminates at the locations where the connecting path intersects the source and destination visual objects; and means for extending a connecting link between the source and destination visual objects terminating at said locations.

According to still yet another aspect of the present invention there is provided an object-connecting tool for creating a connecting link joining source and destination visual objects comprising:

means for determining a path for said connecting link between said source and destination visual objects; and means for representing said connecting link by at least one non-line shape.

According to still yet another aspect of the present invention there is provided a computer readable medium including a computer program for ordering visual objects presented on a display, said computer program comprising:

computer program code for comparing visual objects to be placed in an overlapping condition;

computer program code for determining the order in which said visual objects are to be placed based on said comparison; and computer program code for re-ordering and placing the visual objects in said overlapping condition in accordance with said determination.

According to still yet another aspect of the present invention there is provided a computer readable medium including a computer program for creating a connecting link between source and destination visual objects, said computer program comprising:

computer program code for determining a region within each visual object to be joined and a connecting path extending between the regions;

computer program code for clipping the connecting path so that the connecting path terminates at the locations where the connecting path intersects the source and destination visual objects; and computer program code for extending a connecting link between the source and destination visual objects terminating at said locations.

According to still yet another aspect of the present invention there is provided a computer readable medium including a computer program for creating a connecting link joining source and destination visual objects, said computer program comprising:

computer program code for determining a path for said connecting link between said source and destination visual objects; and computer program code for representing said connecting link by at least one non-line shape.

The present invention provides advantages in that diagramming restrictions associated with conventional diagramming computer software programs are removed. As a result, the present invention provides diagramming tools that offer users increased freedom in how visual objects and connecting links interact. The overlapping object tool automatically places visual objects in an aesthetically pleasing way, without requiring tedious manual placement and/or adjustment of the visual objects. The object-connecting tool allows connecting links to be drawn between visual objects of virtually any shape and allows users to shape the connecting links to provide enhanced visual meaning to the connecting links. When the overlapping object and object-connecting tools are integrated and used in conjunction, users are able to create diagrams with significantly increased visual richness.

BRIEF DESCRIPTION OF THE DRAWINGS

Embodiments of the present invention will now be described more fully with reference to the accompanying drawings in which:

FIGS. 8a to 8c show the steps performed during creation of a straight line connecting link joining source and destination visual objects;

FIG. 9 shows the path of a self-looping connecting link;

FIG. 10 shows one embodiment of link clipping of a self-looping connecting link;

FIG. 11 shows another embodiment of linking clipping of a self-looping connecting link;

DETAILED DESCRIPTION OF THE EMBODIMENTS

The present invention provides diagramming tools that allow a user to create enhanced diagrams of visual objects. During creation of a diagram that includes visual objects, overlapping visual objects are automatically arranged in order of appearance to provide a three-dimensional context to the diagram. A wide variety of shapes and representations of connecting links are available to link visual objects. In this manner, the user can connect visual objects in an appealing manner and that provides a more meaningful representation.

The present invention can be incorporated into a wide range of computer application programs that manage the use of visual objects thereby to provide enhanced functionality to those computer application programs. These types of computer application programs include, but are not limited to concept mapping, flow-charting, mind mapping, technical engineering, diagramming, white boarding, gaming, visualization tools, graphical layout and design, three-dimensional modeling and animation programs.

The present diagramming tools include an overlapping object tool and an object-connecting tool. The overlapping object tool automatically overlaps displayed visual objects to provide z-order to the displayed visual objects without requiring the user to navigate through displayed menus as is required in the prior art. The automatic arrangement of visual objects places overlapping visual objects in a favourable way to what the user expects and enables the user to arrange visual objects without accidentally moving a visual object out-of-sight. The object-connecting tool allows connecting links to be drawn between visual objects of virtually any shape. The object-connecting tool also determines the shortest distance for connecting links interconnecting arbitrarily shaped visual objects and allows connecting links to be shaped providing enhanced visual meaning to the connecting links. The overlapping object tool and the object-connecting tool can be run independently or in conjunction depending on the needs of the user. Further specifies of the overlapping object tool and object-connecting tool will now be described with reference to FIGS. 1 to 45.

Overlapping Object Tool

The overlapping object tool compares displayed visual objects to determine the relative sizes of the visual objects to be placed in an overlapping condition and automatically overlaps the visual objects i.e. changes the z-order of the overlapping visual objects. During the overlapping process, larger visual objects are automatically placed behind smaller visual objects. The operation of the overlapping object tool will now be described with reference to FIGS. 1 to 5.

Figure 1:
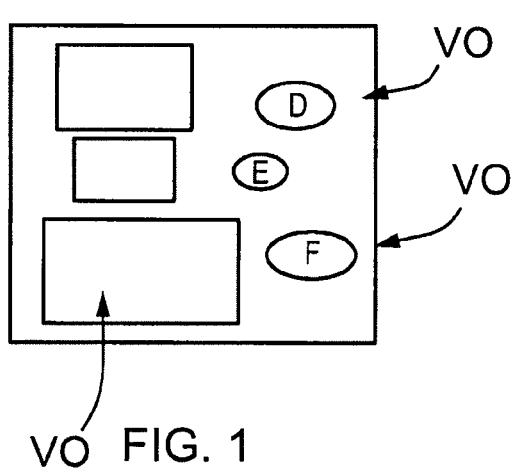
FIG. 1 shows a set of visual objects presented on a computer display and arranged in a non-overlapping condition.
Figure 2:
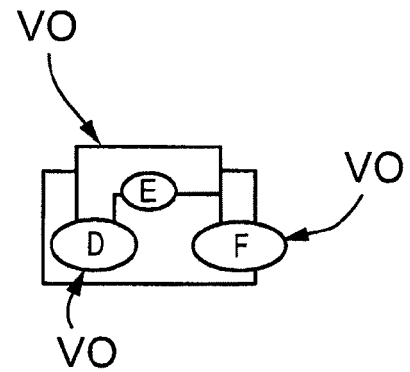
FIG. 2 shows the set of visual objects of FIG. 1 arranged in an overlapping condition using an overlapping object tool in accordance with the present invention.

Turning now to FIG. 1, a display is shown presenting a set of two-dimensional, differently shaped, non-overlapping visual objects VO. If the visual objects are to be placed in an overlapping condition, the overlapping object tool is run. When run, the overlapping object tool compares each of the displayed visual objects VO to determine the relative sizes of the visual objects i.e. which visual objects are bigger than others. The overlapping object tool then automatically arranges the visual objects so that they overlap with bigger visual objects appearing behind smaller visual objects as shown in FIG. 2. The pseudo code below represents the above operation:

```
--------
Automatic Overlap Visual Object A amongst a set C:
    -for each visual object B in set C in order of overlap, from the
    bottom to the top
        -if visual object A is bigger than visual object B, insert
        visual object A behind
visual object B
--------
```

In order to determine whether a visual object is bigger than another visual object, in the present embodiment, the overlapping object tool calculates the areas of rectangular regions surrounding the visual objects and compares the calculated areas. Calculating the areas of the rectangular regions can be performed quickly and easily. Comparing the calculated areas typically yields results that properly overlap the visual objects.

If desired, other measures can be used to determine the relative sizes of the visual objects. For example, rather than calculating the areas of rectangular regions surrounding the visual objects, the overlapping object tool can calculate the actual display area taken up by the visual objects using a number of techniques such as for example polygon approximations or viewable pixel summations.

Figure 3:
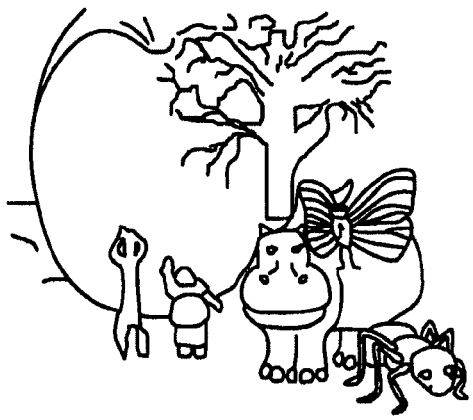
FIG. 3 shows another set of visual objects arranged in an overlapping condition using the overlapping object tool.

As will be appreciated depending on the nature of the visual objects, the measure used to determine whether a visual object is "bigger" than another visual object may vary. If the visual objects are three-dimensional, a comparison of volume or other dimension or prominent metric may be made to determine whether a visual object is bigger than another visual object. If the visual objects are heterogeneous i.e. different shapes and forms, the measure selected to compare the visual objects should apply to all of the visual objects to be placed in an overlapping condition so that the desired z-order of the visual objects can be achieved. FIG. 3 shows a number of heterogeneous visual objects placed in an overlapping condition by the overlapping object tool. As can seen, larger visual objects appear behind smaller visual objects.

The overlapping object tool is preferably used with a computer application program that allows visual objects to be manipulated on-screen and automatically changes the z-order of visual objects as visual objects are dragged or moved into an overlapping condition thereby to provide real-time visual object re-ordering. Of course, if desired, the overlapping object tool can be conditioned to change the z-order of a visual object brought into an overlapping condition only after the visual object has been released from the drag or move operation. Alternatively, the overlapping object tool can be conditioned to change the z-order of overlapping visual objects in response to an input command. In this manner, a user is able to drag or move one or more visual objects into an overlapping condition and then subsequently run the overlapping object tool to re-order the overlapping visual objects.

Figure 4A:
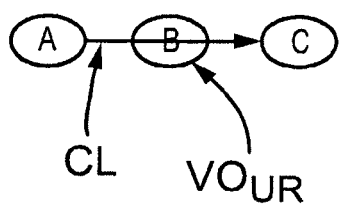
FIG. 4a shows two visual objects joined by a connecting link that extends across an unrelated visual object.
Figure 4B:
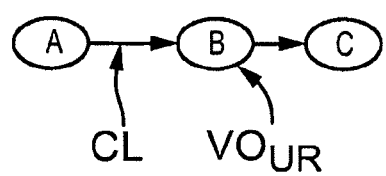
FIG. 4b shows the connecting link of FIG. 4a placed behind the unrelated visual object by the object overlapping tool in accordance with a user customization.
Figure 5:
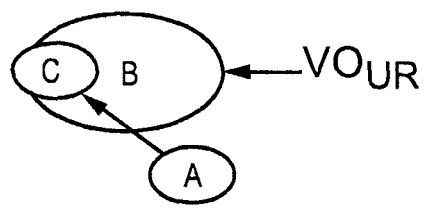
FIG. 5 shows two visual objects joined by a connecting link that extends partially across an unrelated visual object.

The overlapping object tool allows a user to customize the visual object ordering rules so that symbols such as connecting links relating to and linking two or more visual objects are handled in accordance with the user's preferences. For example, if a connecting link CL joining two visual objects completely crosses an unrelated visual object $VO_{UR}$ as shown in FIG. 4a, the overlapping object tool can be conditioned to place the connecting link beneath the unrelated visual object $VO_{UR}$ as shown in FIG. 4b. If a connecting link CL intersects an unrelated visual object $VO_{UR}$ but terminates within that unrelated visual object, the overlapping object tool maintains the connecting link CL above the unrelated visual object $VO_{UR}$ as shown in FIG. 5. Other visual object ordering rule customizations are available to the user to deal with other connecting link conditions such as for example when a connecting link joins two overlapping visual objects and one end of the connecting link is obscured by the visual object that overlaps the other visual object.

Object-Connecting Tool

Unlike prior art diagramming tools, the present object-connecting tool avoids the use of rigidly defined anchor points for terminating connecting links on visual objects. As a result, the orientation of curved connecting links extending between visual objects is maintained as the visual objects are manipulated. Also, the object-connecting tool joins visual objects with connecting links of the shortest possible length. Since anchor points are not used to terminate visual objects, visual objects can take on virtually any shape and still be joined by connecting links that fully extend between the visual objects. As a result, connecting links can be used to join visual objects that include transparent regions.

Figure 6:
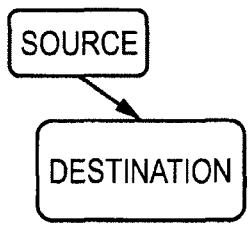
FIG. 6 shows a source visual object and a destination visual object joined by a connecting link.

The object-connecting tool defines a connecting link as a path that joins a source visual object and a destination visual object as shown in FIG. 6. Each of the source and destination visual objects is a node object that either has a shape or is a finite point. At each end of the connecting link there can either be a zero or an arrowhead pointing to the visual object.

Figure 7:
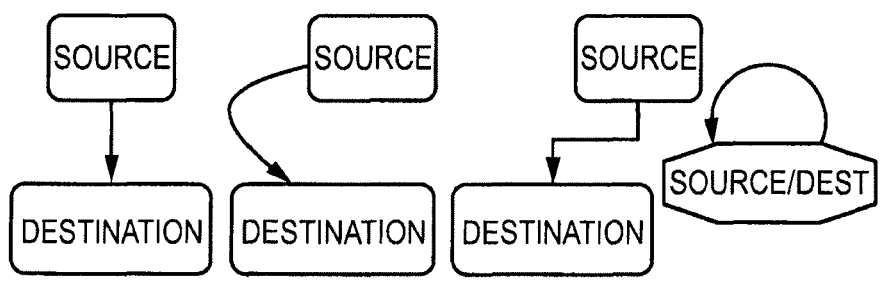
FIG. 7 shows source and destination visual objects joined by connecting links of different path type.
Figure 12A:
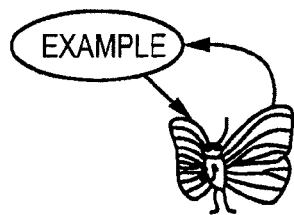
FIGS. 12a to 12d show examples of connecting links of different path type joining differently shaped visual objects.
Figure 12B:
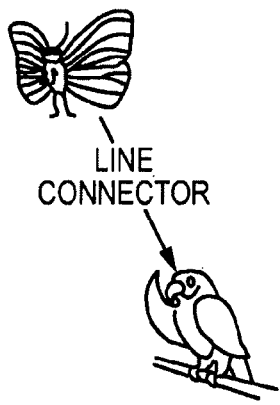
Figure 12C:
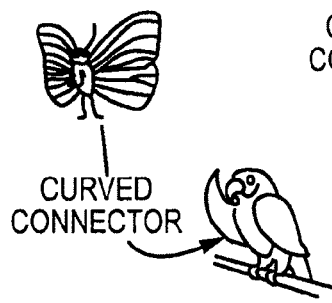
Figure 12D:
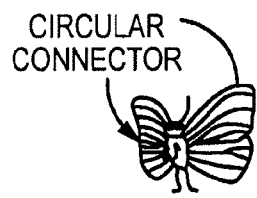

The path of the connecting link is abstractly defined and includes a designated path type selected from the group of a straight line, a cubic curve, a right-angled line or a circular self-loop as shown in FIG. 7. The path also defines properties of the connecting link. The path properties include pattern, link shape, thickness, color and control points. The pattern property determines whether the connecting link is solid, dotted, dashed etc. The link shape determines whether the connecting link is represented by a line or by a series of non-line shapes as will be described.

During creation of a connecting link extending between source and destination visual objects, the object-connecting tool determines a connecting path that joins the centers of the source and destination visual objects. The object-connecting tool then clips the connecting path using a link clipping process to determine accurately the intersection of the connecting path with the boundaries of the source and destination visual objects so that the connecting link terminates at the intersection points. If appropriate arrowheads are then added to the end or ends of the connecting link.

During the link clipping process, the object-connecting tool flattens the connecting link into line segments, if necessary i.e. if the connecting link is curved, and then calls a contains( ) method that queries the source and destination visual objects for information concerning their shapes. Visual objects include information concerning the bounds of their shapes. During a query by the contains( ) method, two-dimensional points along the connecting path are examined to determine whether the points lie within a visual object. The contains( ) method query returns a true result if a point on the connecting path lies within a visual object and a false result otherwise. This allows the point along the connecting path where the connecting path initially intersects each visual object to be determined and hence the points along the connecting path where the connecting path is to be clipped.

As mentioned above, the object-connecting tool supports irregular shaped visual objects including those having transparent regions. To avoid a connecting path being clipped within a transparent region, the contains( ) method does not consider transparent regions within a visual object to be part of the visual object for the purpose of link clipping. To support such a visual object, a transparency bitmap is included defining transparent regions of the visual object.

Following link clipping, the object-connecting tool places an arrowhead at the end or ends of the connecting link if appropriate. The orientation of each arrowhead depends on the locations of the source and destination visual objects relative to one another and the path of the connecting link. In order to compute arrowhead orientation, the destination vectors of the source and destination visual objects are determined using the connecting link or flattened line segments if the connecting link is curved. Once the arrowhead orientation is determined, each arrowhead is placed at the end of the connecting link with the tip of the arrowhead terminating at the visual object. The clip-point along the connecting path is then translated by the length of the arrowhead in the direction opposite that of the destination vector so that the connecting link ends at the backend of the arrowhead.

Turning now to FIGS. 8a to 8c, the above-described connecting link creation process performed by the object-connecting tool for a straight line connecting link joining source and destination visual objects is shown. Initially, a straight line connecting path CL joining the centers of the source and destination visual objects is determined as shown in FIG. 8a. Once determined, the link clipping process is invoked. In this example, since the connecting path CL is a straight line in the form a single line segment, no flattening of the connecting path is required. During link clipping, the object-connecting tool calls the contains( ) method which traverses the connecting path CL to determine the precise points along the connecting path where the connecting path intersects the source and destination visual objects and hence the clip-points for the connecting path. Once the clip-points have been determined, the connecting path is clipped resulting in a connecting link extending between the visual objects. In this example, an arrowhead is placed at one end of the connecting link as shown in FIG. 8b. The orientation of the arrowhead is computed using the destination vector. With the arrowhead placed at the end of the connecting link, the clip-point is translated by the length of the arrowhead, in the direction opposite that of the destination vector so that the connecting link ends at the backend of the arrowhead as shown in FIG. 8c.

As mentioned above with reference to FIG. 7, a curved connecting link extending between source and destination visual objects is represented by a cubic curve. The centers of the source and destination visual objects and a control point that can be manipulated by a user, define the cubic curve. During link clipping of a curved connecting link, the link path is flattened into a poly-line approximation of the cubic curve including a plurality of straight line segments. During the contains( ) method, each straight line segment is traversed to determine the clip-points for the connecting path.

The link path of a self-looping connecting link has the same visual object as its source and destination. A circle having a diameter formed by a line segment joining the center of the visual object and an external control point defines the path of the self-looping connecting link as shown in FIG. 9. During link clipping of a self-looping connecting path, Bresenham's circle drawing algorithm is used to compute the point array defining a flattened circular path of the connecting path as shown in FIG. 10. The point array is then traversed in both clockwise and anti-clockwise directions to determine the clip-points along the connecting path. If arrowheads are to be placed at the ends of the self-looping connecting link, the point array is then traversed in the opposite direction from each clip-point, until the distance from the clip-point is equal to the length of the arrowhead. The arrowheads are then placed at the ends of the connecting link with their orientation being determined by the tangent vectors to the circle at the end points of the self-looping connecting link.

Alternatively, a binary search method may be used to determine the clip-points along the self-looping connecting path as shown in FIG. 11. Although this method works, the results are not ideal if the visual object is not convex-shaped. Also, when using the binary search method the arrowheads may get distorted if the diameter of the circle defining the self-looping connecting path is small.

Figure 13A:
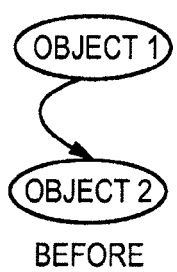
FIGS. 13a and 13b show a prior art connecting link joining visual objects before and after manipulation of the visual objects.
Figure 13B:
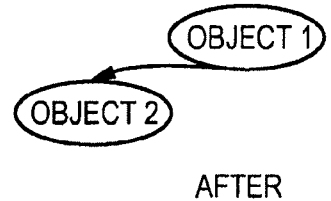
Figure 14A:
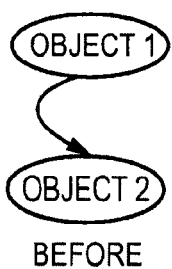
FIGS. 14a and 14b show a connecting link joining visual objects created by the present object-connecting tool before and after manipulation of the visual objects.
Figure 14B:
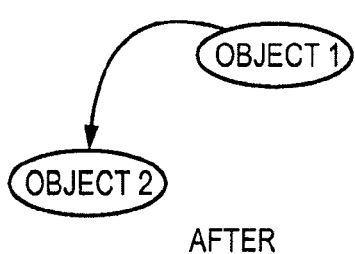

As will be appreciated, the object-connecting tool allows connecting links to be properly clipped so that they terminate at the intersection points of the source and destination visual objects. Since the object-connecting tool does not rely on anchor points to terminate connecting links, connecting links terminate at the visual objects regardless of the shapes of the visual objects. FIGS. 12a to 12d show examples of connecting links of different path type joining differently shaped visual objects. As will be appreciated, the connecting links terminate at the visual objects. Also, since connecting links are determined from connecting paths joining the centers of the visual objects, the shapes of the connecting links are preserved after visual objects are manipulated. FIGS. 13a and 13b show a prior art connecting link joining two visual objects before and after manipulation. Since the prior art connecting link is joined to the visual objects at anchor points, the shape of the connecting link becomes distorted after the visual objects are manipulated (FIG. 13b). FIGS. 14a and 14b show a connecting link joining two visual objects created by the present object-connecting tool before and after manipulation. Since the connecting link is not anchored to the visual objects, the shape of the connecting link is preserved after the visual objects are manipulated.

Although specific connecting link path types have been described above, it will be appreciated that virtually any connecting link path type can be used. For example bezier curves, poly-lines or even compound paths can be used to join visual objects. During link clipping, these connecting paths are flattened into straight line segments that are traversed to determine the clip-points.

Figure 15A:
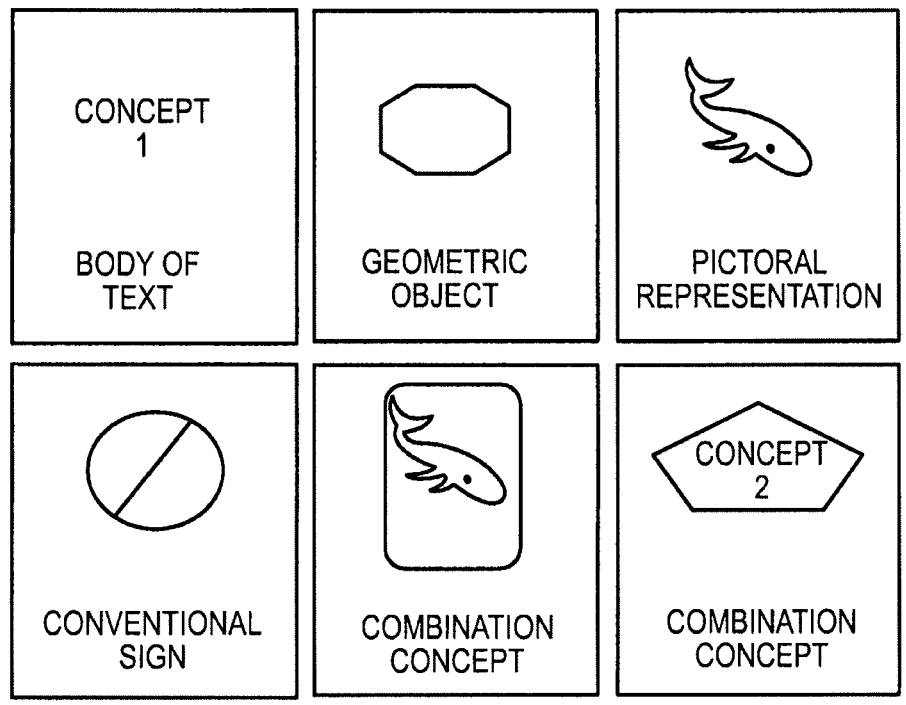
FIG. 15a shows examples of visual objects representing concepts.
Figure 15B:
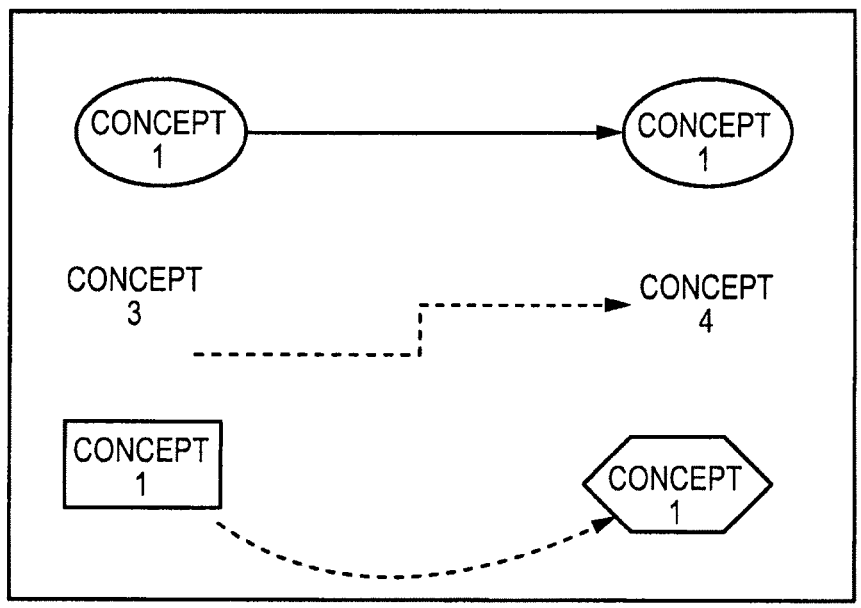
FIG. 15b shows examples of prior art connectors joining visual objects in concept maps.

In addition to connecting visual objects with connecting links in the form of straight, dashed or dotted lines, the object-connecting tool also allows connecting links to be represented by non-line shapes extending along the lengths of the connecting paths. This gives the connecting links more meaning than is available when using lines as the connecting links. Providing this additional meaning has advantages particularly in the case of concept maps. As is known, a concept map is a diagram used to explore, share and teach information that includes visual objects representing concepts and connectors joining the visual objects. In the past, although many different styles of visual objects have been used in such concepts maps, the types of connectors used have been limited. In fact to-date, the only variations in connectors have been line shape i.e. straight, right-angled or curved, line color and line pattern i.e. solid, dashed or dotted. In all cases the connectors have been lines. FIG. 15a shows examples of visual objects representing concepts and FIG. 15b shows examples of prior art line connectors joining visual objects. Without text accompanying these line connectors, it is difficult to determine the relationship between the joined visual objects. Since the present object-connecting tool allows connecting links to be represented by shapes, in the case of concept maps, the connecting links allow concept maps to be more quickly understood and provide more information to a viewer at a glance. The connecting links visually convey the relationship between the visual objects that they join.

Figure 16:
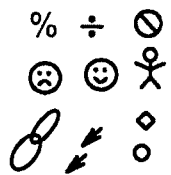
FIG. 16 shows a plurality of shapes for use with shaped connecting links.
Figure 17A:
FIGS. 17a and 17b show examples of shaped connecting links joining visual objects.
Figure 17A:
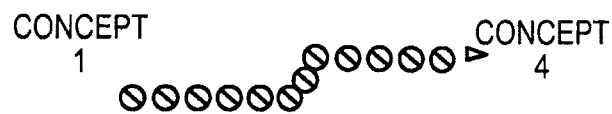
Figure 17A:
Figure 17B:
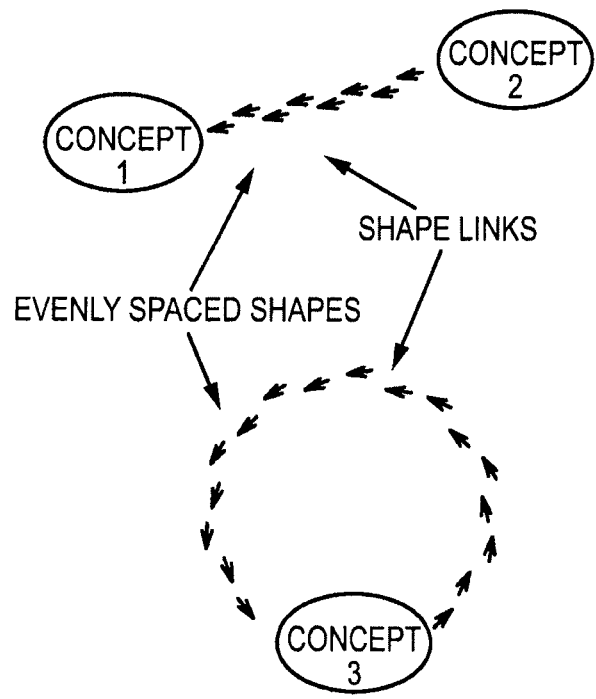

Shaped connecting links generated by the object-connecting tool typically include one or more shapes drawn repeatedly at generally evenly spaced locations along their lengths. The object-connecting tool can be conditioned to apply the shapes associated with the shaped connecting link as the shaped connecting link is being drawn or can be conditioned to draw the shapes after the connecting link has been created. The object-connecting tool also allows the shapes associated with a shaped connecting link to be changed. The shapes used with shaped connecting links provide a pictorial representation of a thing, an arbitrary or conventional sign used to represent operations, quantities, elements, relations or qualities, or a geometric object. For example, the shapes may include light bulbs, foot or animal prints, emoticons such as happy or sad faces, paper clips, lightening bolts, money symbols or other symbol, shape or graphic that provides a meaning. FIG. 16 shows a plurality of possible shapes for use with shaped connecting links. FIG. 17a is similar to FIG. 15 but shows visual objects joined by shaped connecting links. FIG. 17b also shows visual objects joined by shaped connecting links.

Shapes used by the object-connecting tool during creation of a shaped connecting link are stored in memory. The object-connecting tool in the present embodiment includes a toolkit storing a plurality of predefined shapes from which a user may select. The toolkit of the object-connecting tool also allows a user to create shapes. During shape creation, the outline co-ordinates and color of the shape are defined by the user. The size of the shape is then set. All areas associated with the shape are then created. For example, a shape in the form of a duck could have the area specified by the following outline co-ordinates of:

x={1, 4, 7, 9, 4, 6, 3, 5, 7}, y={3,4,5,3,4,5,6,7,8}.

Shapes can also be created from the predefined shapes supplied by the toolkit of the object-connecting tool. For example, a happy face can be created using a circle to define the outline of the happy face and ellipses to form the eyes. Shapes can also be created by specifying outline co-ordinates and using predefined shapes supplied by the toolkit of the object-connecting tool. Each shape includes an orientation vector that defines its upright orientation.

When it is desired to generate a shaped connecting link, the shape to be used to represent the connecting link is selected. Once the shape has been selected, the object-connecting tool uses a path mapping technique to determine the co-ordinates along the path of the connecting link where the shapes are to be painted. The path mapping technique varies depending on the shape of the connecting link used to join the visual objects.

Figure 18:
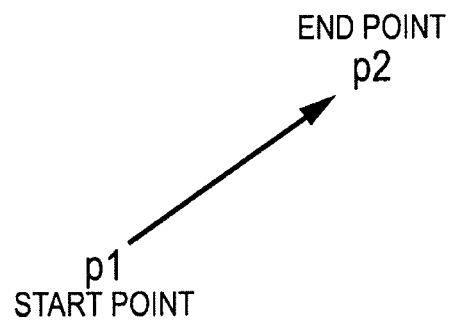
FIG. 18 shows the determination of start and end points of a shaped connecting link.

If the shapes are to be painted along a shaped connecting link that follows a straight line, the start and end points of the shaped connecting link are firstly determined as shown in FIG. 18.

Next, a spacing distance between the centres of adjacent shapes is set to the width of the shape plus a few extra pixels to provide a desired spacing between the shapes. The angle of the slope of the connecting link is then determined using the following formula:

$$\theta = \tan^{-1}\left(\frac{y_{p2} - y_{p3}}{x_{p3} - x_{p2}}\right)$$

where $(x_{p2}, y_{p2})$ and $(X_{p3}, Y_{p3})$ are the co-ordinates of p2 and p3 respectively. The values $y_{p2}$ and $y_{p3}$ are reversed to compensate for the fact that the y cartesian values decrease from top to bottom. Using this angle, the changes in x and y corresponding to a shift along the connecting link equal to the spacing distance are determined as follows:

$$x_{SD} = \text{abs}(\text{spacing distance} \cdot \cos\theta)$$

$$y_{SD} = \text{abs}(\text{spacing distance} \cdot \sin\theta)$$

The co-ordinates $x_1Pt$ and $y_1Pt$ along the shaped connecting link where the first shape is to be painted are then determined. For ease of illustration, it will be assumed that the shaped connecting link is sufficiently long enough to accommodate at least one shape. In some circumstances, it can be desired to place the first shape along the connecting link a distance different than the spacing distance between adjacent shapes, but for the purpose of simplicity, it will be assumed for this straight connecting link that the starting distance is equal to the spacing distance. In this example, it will be assumed that the connecting link spans a height equal to 15 units and a width equal to 9 units. There are four cases that determine the co-ordinates along the connecting link where the first shape will be painted dependent on the angle of the straight connecting link.

Figure 19:
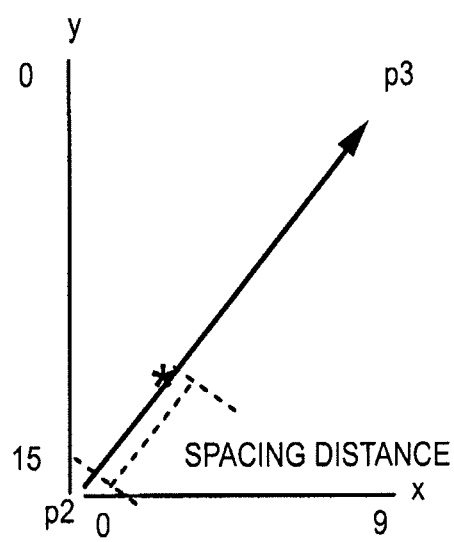
FIG. 19 shows the point along the connecting path of the shaped connecting link where the first shape is to be placed when the connecting path forms an angle between 0 and 90° with respect to the horizontal.

If the connecting link forms an angle between 0 and 90 degrees with respect to the horizontal, the position of the first shape along the connecting link is determined as follows. The first shape is spaced from the tail end of the connecting link, $P_2$, by a distance equal to the spacing distance to be used between shapes as shown in FIG. 19. Subsequent shapes are spaced along the connecting link in a similar manner. The object-connecting tool determines the co-ordinates for each shape in the manner identified below:
Co-ordinates: p2=(100, 120) p3=(109, 105)
p2.x becomes small_x; (since p2.x<p3.x)
p2.y becomes large_y; (since p2.y>p3.y)
Thus, $$x_iPt = \text{small\_}x + i \cdot x_{SD}; \text{ and}$$

$$y_iPt = \text{large\_}y - i \cdot y_{SD}$$

where i is the number of the shape for which the co-ordinates are being determined.

Figure 20:
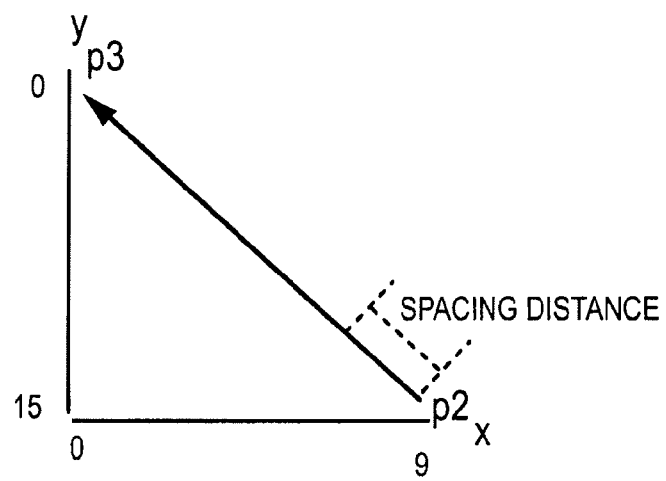
FIG. 20 shows the point along the connecting path of the shaped connecting link where the first shape is to be placed when the connecting path forms an angle between 90° and 180° with respect to the horizontal.

If the connecting link forms an angle between 90 and 180 degrees with respect to the horizontal, the first shape is drawn along the connecting link at the position shown by the asterisk in FIG. 20. The object-connecting tool determines the co-ordinates for each shape in the manner identified below:
Co-ordinates: p2=(109, 120) p3=(100, 105)
p2.x becomes large_x; (since p2.x>p3.x)
p2.y becomes large_y; (since p2.y>p3.y)
Thus, $$x_iPt = \text{large\_}x - i \cdot x_{SD}; \text{ and}$$

$$y_iPT = \text{large\_}y - i \cdot y_{SD}$$

Figure 21:
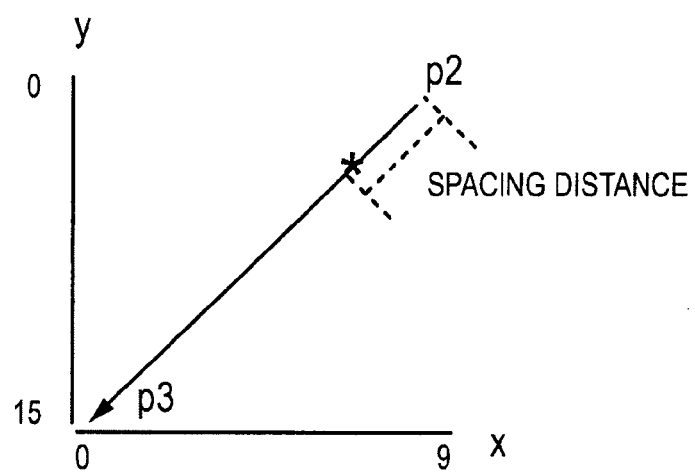
FIG. 21 shows the point along the connecting path of the shaped connecting link where the first shape is to be placed when the connecting path forms an angle between 180° and 270° with respect to the horizontal.

If the connecting link forms an angle between 180 and 270 degrees with respect to the horizontal, the first shape is drawn along the connecting link at the position shown by the asterisk in FIG. 21. The object-connecting tool determines the co-ordinates for each shape in the manner identified below:
Co-ordinates: p2=(109, 105) p3=(100, 120)
p2.x becomes large_x; (since p2.x>p3.x)
p2.y becomes small_y; (since p2.y<p3.y)
Thus, $$x_iPt = \text{large\_}x - i \cdot x_{SD}; \text{ and}$$

$$y_iPt = \text{small\_}y + i \cdot y_{SD}$$

Figure 22:
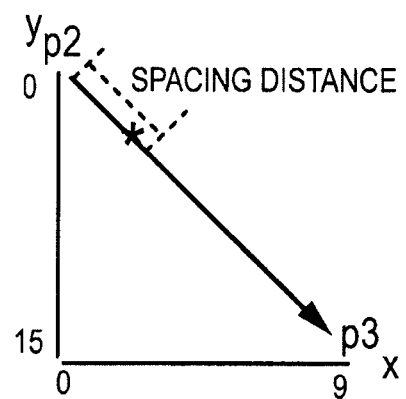
FIG. 22 shows the point along the connecting path of the shaped connecting link where the first shape is to be placed when the connecting path forms an angle between 270° and 360° with respect to the horizontal.

If the connecting link forms an angle between 270 and 360 degrees with respect to the horizontal, the first shape is drawn along the connecting link at the position shown by the asterisk in FIG. 22. The object-connecting tool determines the co-ordinates for each shape in the manner identified below:
Co-ordinates: p2=(100, 105) p3=(109, 120)
p2.x becomes small_x; (since p2.x<p3.x)
p2.y becomes small_y; (since p2.y<p3.y)
Thus, $$x_iPt = \text{small\_}x + i \cdot x_{SD}; \text{ and}$$

$$y_iPt = \text{small\_}y + i \cdot y_{SD}$$

Once the co-ordinates for the shapes along the path of the shaped connecting link are determined, the rotation angle of the shapes to be painted is determined based on the angle formed between the connecting link and the horizontal. The rotation is determined using the following:
If ($\theta$ mod 180°)<90°,
rotation=counter-clockwise ($\theta$ mod 180°)
If ($\theta$ mod 180°)≧90°,
rotation=clockwise [180°−($\theta$ mod 180°)]
While this method of determining the rotation is used to provide shapes that are right side-up, it can be desirable in some circumstances to have upside-down shapes.

Figure 23:
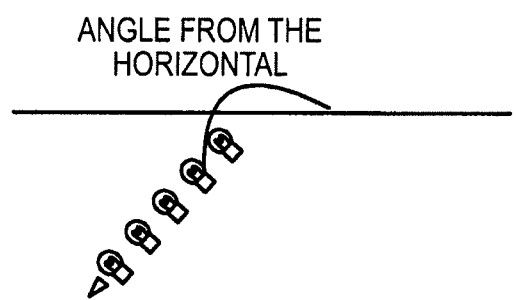
FIG. 23 shows an example of a shaped connecting link forming an angle with the horizontal and including shapes that have been rotated corresponding to the formed angle.
Figure 24:
FIG. 24 shows a shape at various rotations.

The rotation angle is then used to orient the shapes as they are painted. FIG. 23 shows an example of a shaped connecting link forming an angle with the horizontal and including shapes that have been rotated corresponding to the formed angle. FIG. 24 shows a shape at various rotations.

Figure 25:
FIG. 25 shows the point of a shape used to locate the shape along the connecting path.

With the shape co-ordinates and shape rotation determined, the first shape is painted along the path of the connecting link. During painting the object-connecting tool paints the shape so that the center of the shape is positioned at the determined shape co-ordinates. To achieve this, the object-connecting tool specifies where the top left corner of the shape is to be placed as shown in FIG. 25. For the shape to be centered at the shape co-ordinates, the co-ordinates of the top left corner of the shape (prior to rotation) are calculated by subtracting one half of the height of the shape from the y-coordinate and subtracting one half of the width of the shape from the x-co-ordinate. These co-ordinates are then used to paint the shape.

Figure 26:
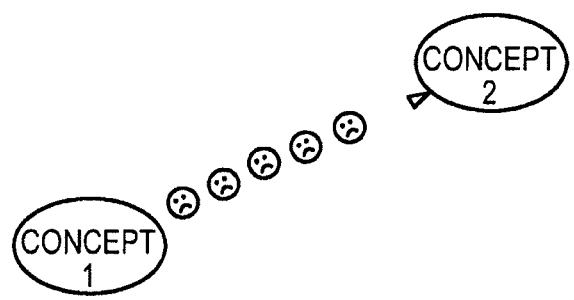
FIG. 26 shows a series of shapes painted along the connecting path and forming a shaped connecting link.

With the first shape painted, the co-ordinates along the path of the connecting line where the next shape is to be painted are determined by translating along the path a distance equal to the shape spacing distance. This is performed by using the appropriate formula depending on the angle of the connecting link and with the appropriate value for i corresponding to the number of the shape. As the connecting link in this example is a straight line, the orientation of each subsequent shape is equal to that of the first. The second shape is then painted at the position ($x_2$Pt, $y_2$Pt). This process continues until the distance between the end of the path of the connecting link and the last painted shape is less than the shape spacing distance as shown in FIG. 26.

Creating a curved shaped connecting link is similar to creating a straight line shaped connecting link, however there are some differences. As mentioned above, the curved connecting link is flattened into a series of straight line segments.

Assuming each shape is to be spaced an equal distance apart, the spacing distance is set to the width of the shape plus a few extra pixels to provide the desired space between shapes. The co-ordinates of the start and end points of the first straight line segment (i.e., $p_1$ and $p_2$) from the set that makes up the curved connecting link are first obtained. The distance between the two points is then compared with a starting distance that is set to be equal to the shape spacing distance.

Figure 27:
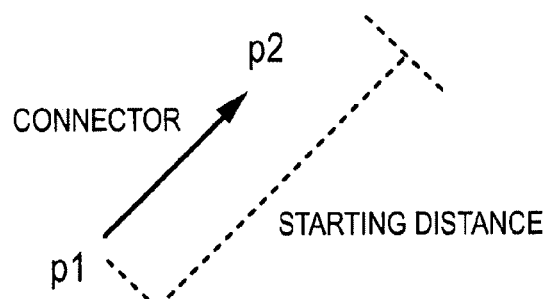
FIG. 27 shows the situation when the distance between the start and end points of a straight line segment are less than the start location for the first shape.

If the distance between the start and end points of the straight line segment in question is less than the starting distance, such as shown in FIG. 27, there is not enough room to paint the shape on the straight line segment. This distance between the two end co-ordinates is then added to a variable carryover, which is initialized to zero at the start for a curved connecting link.

Figure 28:
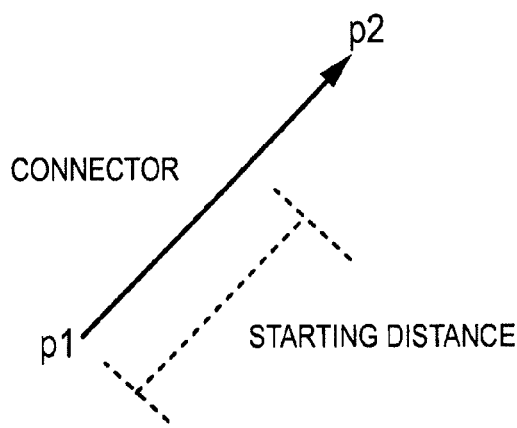
FIG. 28 shows the situation when the distance between the start and end points of a straight line segment is greater than or equal to start location for the first shape.
Figure 29:
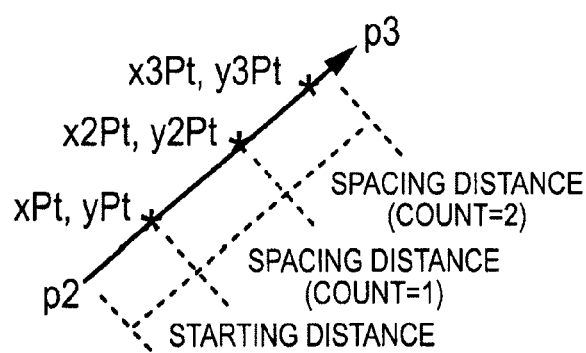
FIG. 29 shows multiple shape locations along a straight line segment.

If the distance between the start and end points of the straight line segment is greater than or equal to the starting distance, such as shown in FIG. 28, the positions of shapes to be painted therealong are determined. FIG. 29 shows how multiple spacing distances may be placed between points p1 and p2. As a result, multiple shapes may be placed between points p1 and p2. The same process used to paint shapes on a straight line connecting link, as described above, is used to paint one or more shapes along the first straight line segment of the curved connector.

Figure 30:
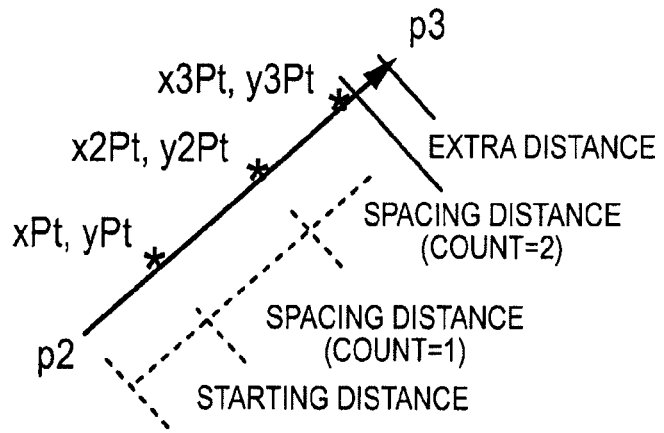
FIG. 30 also shows multiple spaced shape locations along a straight line segment.

The distance along the straight line segment between the last shape and the end of the straight line segment as shown in FIG. 30 is then assigned to the variable carryover.

After the first straight line segment of the curved connecting link has been addressed, the next straight line segment along the curved connecting link is examined. As it is desired to space the shapes equally along the entire length of the curved connecting link, if a shape was not painted at the end of the previous straight line segment, the first shape can be placed closer to the start of the straight line segment being examined. The starting distance representing the placement of the first shape along the straight line segment being examined is reduced by the variable carryover, the amount of unused length of the previous straight line section:

starting distance=spacing distance−carryover

If the starting distance is greater than the length of the straight line segment being examined, the variable carryover is adjusted to reflect the increased distance between the last shape along the curved connecting link:

carryover=carryover+length of straight line section

If the starting distance is less than or equal to the length of the straight line segment being examined, a shape is painted at a distance along the straight line segment corresponding to the starting distance. Subsequent shapes are painted along the length of the straight line segment, each separated by the spacing distance. The co-ordinates for these shapes are determined in accordance with the above described formulas for the different shapes, but adjusted as follows:

For straight line segments at an angle between 0 and 90 degrees from the horizontal:

$$x_iPt = \text{small\_x} + \left(\frac{\text{starting distance}}{\text{spacing distance}} + i\right)x_{SD}$$

$$y_iPt = \text{large\_y} - \left(\frac{\text{starting distance}}{\text{spacing distance}} + i\right)y_{SD}$$

Figure 31:
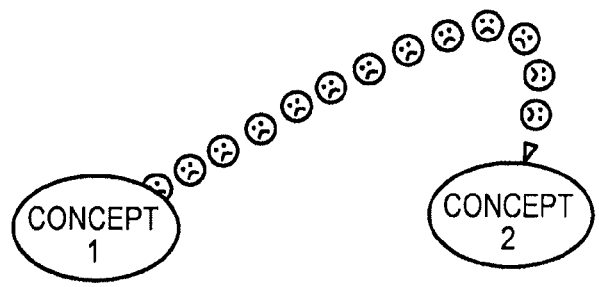
FIG. 31 shows a curved shaped connecting link.

Any remaining length of the straight line segment shorter than the spacing distance is then assigned to the variable carryover, replacing its current value. If the straight line segment being examined is the last of the curved connecting link, any carryover can be discarded. FIG. 31 shows an exemplary curved connecting link generated in accordance with the above-described process.

Figure 32:
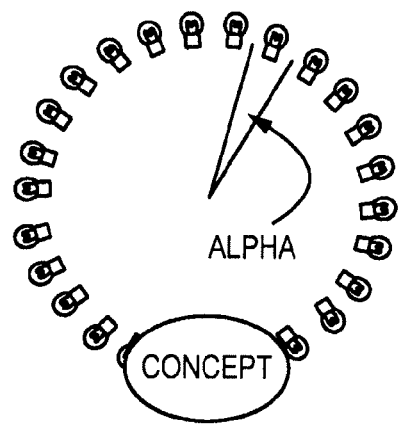
FIG. 32 shows a self-looping shaped connecting link.

Shaped self-looping connecting links can also be created. FIG. 32 illustrates the start and end points of a shaped self-looping connector link. In this case, a modified approach is followed during painting of the shapes. Firstly, the number of shapes to be painted along the shaped self-looping connecting link is determined as follows:

$$\text{numberofshapes} = \frac{\text{circumference}}{\text{spacing distance}}$$

where the number of shapes is rounded down if it is not an integer value.

The origin ($x_0,y_0$) of the circle defining the shaped self-looping connecting link is then determined. This can be done using a number of techniques, including locating of the mid-value in the range of x and y values. Next, the shapes are painted along the circumference of the circle at positions determined using the following formulas.

$$x_i = x_0 + \text{radius}\cdot\cos\left(i\cdot\frac{360°}{\text{numberofshapes}}\right)$$

$$y_i = y_0 + \text{radius}\cdot\sin\left(i\cdot\frac{360°}{\text{numberofshapes}}\right)$$

Figure 33:
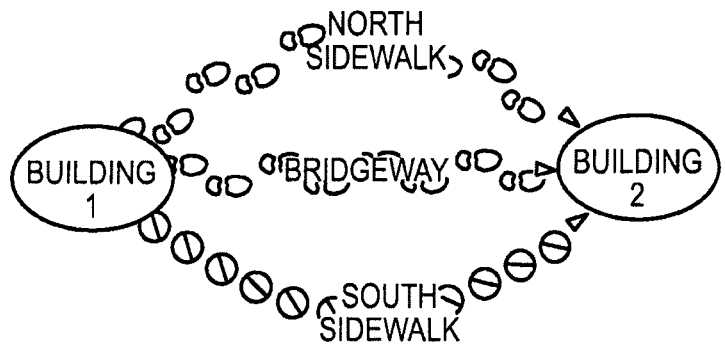
FIGS. 33 to 35 show different examples of visual objects joined by shaped connecting links.
Figure 34:
Figure 35:
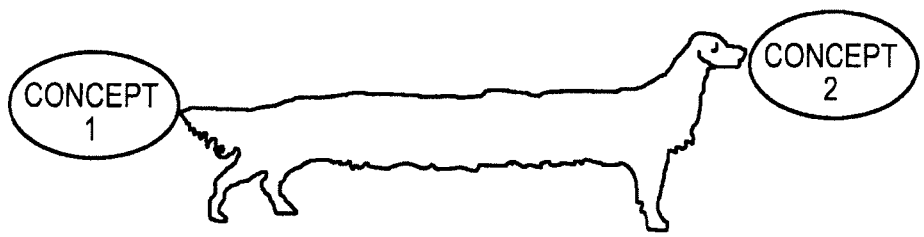

Turning now to FIGS. 33 to 35, examples of visual objects joined by shaped connecting links are illustrated. For example, FIG. 33 shows shaped connecting links joining visual objects representing buildings. In this case, the shapes used along the connecting links represent paths extending between the buildings and provide an indication as to whether the paths have been cleared of snow. FIG. 34 shows two visual objects joined by a shaped connecting link including different shapes along the shaped connecting link.

FIG. 35 shows two visual objects joined by a shaped connecting link including a single shape that has been stretched to extend fully between the visual objects. In this particular example, the stretched shape is a dog, with the head and tail of the dog showing direction as an alternative to conventional arrowheads.

Figure 36:
FIGS. 36 and 37 show differently shaped and colored shapes for use in shaped connecting links.
Figure 37:
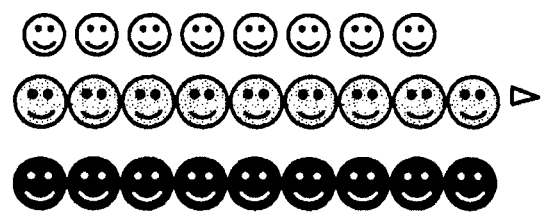

The shapes used along shaped connecting links may vary in size and/or color as shown in FIGS. 36 and 37.

Figure 38:
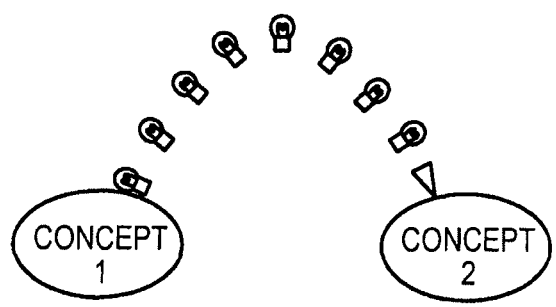
FIG. 38 shows two visual objects joined by a shaped connecting link including shapes rotated at different angles.

FIG. 38 shows two visual objects joined by a shaped connecting link including spaced light bulbs. In this example, the light bulbs are rotated at different angles along the shaped connecting link depending on their locations.

Figure 39:
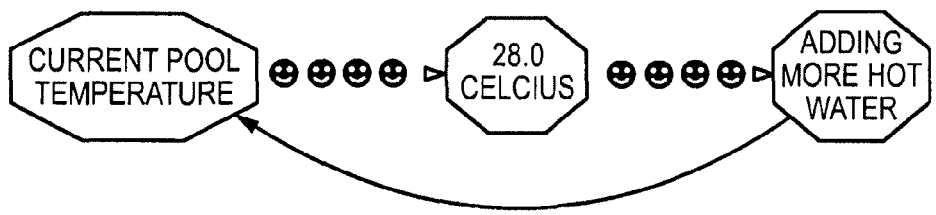
FIGS. 39 and 40 show a concept map representing regulation of water temperature including visual objects joined by shaped connecting links.
Figure 40:
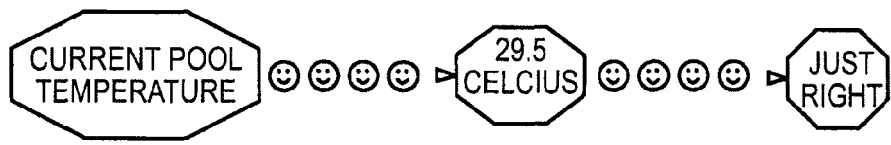

FIGS. 39 and 40 show a concept map representing regulation of water temperature in a swimming pool including visual objects joined by shaped connecting links. In this case, the shapes along the shaped connecting link change depending on the state of the temperature regulation process. In FIG. 39, sad faces are used along the shaped connecting link when the temperature of water in the swimming pool is below the desired temperature. In FIG. 40b, happy faces are used along the shaped connecting link when the temperature of water in the swimming pool is at the desired temperature.

Figure 41:
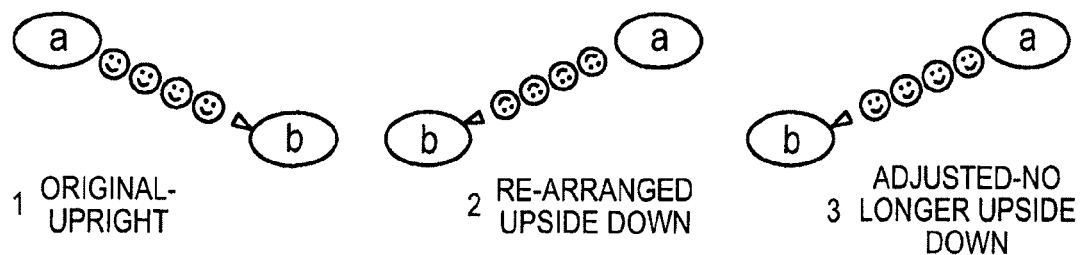
FIG. 41 shows an automatic shape reorientation process.

If desired, the object-connecting tool can be conditioned to reorient automatically the shapes used along shaped connecting link in accordance with their orientation vectors. In this case, if visual objects are dragged or moved causing the shapes along shaped connecting links to become inverted, the object-connecting tool automatically re-orients the shapes to return them to the desired orientation. The object-connecting tool determines that a shape is inverted when its orientation vector rotates past the horizontal. To reorient the shape, the object-connecting tool either rotates the shape by 180 degrees or remaps the vertical drawing co-ordinates of the shape to negative values. FIG. 41 shows the automatic shape reorientation process. As can be seen, visual objects joined by a shaped connecting link are moved relative to one another to a condition where the shapes along the shaped connecting link are inverted. The shapes along the shaped connecting link after having been reinverted by the object-connecting tool.

If desired, sounds can be associated with the shaped connecting links. For example, a continuous sound may be played when a shaped connecting link is drawn. Alternatively, a sound may be played when a shape along a shaped connecting link is selected via a mouse click or by other operation.

If desired, the shapes can be animated with the animation being presented continuously or in response to an event. For example, when a visual object is moved, the shapes along the connecting path can animate the result. Alternatively, interactions may be associated with the shapes along the connecting path. For example, when a shape is selected a tool tip elaborating on the connection between the visual objects may be displayed.

Integrated Overlapping Object and Object-Connecting Tools

Figure 42:
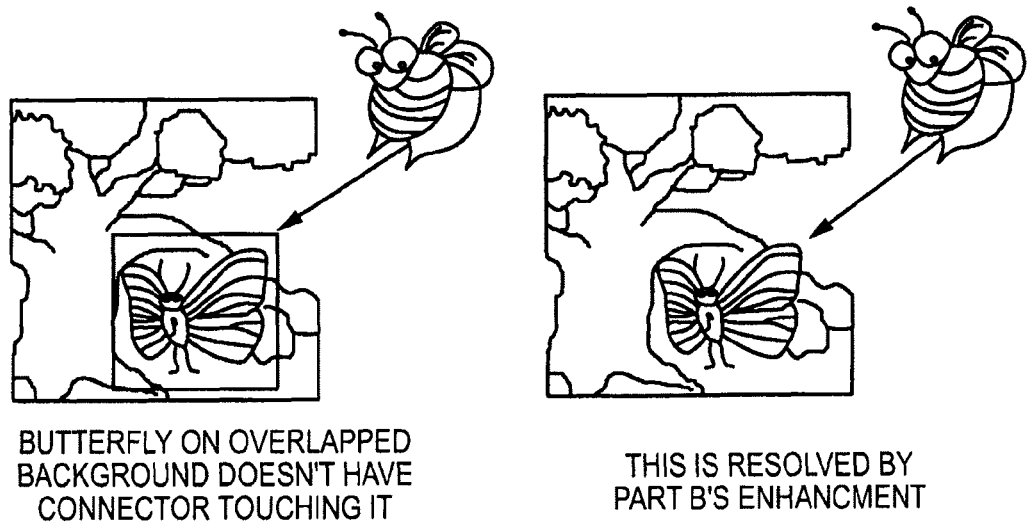
FIGS. 42 to 45 show examples of concept maps including visual objects joined by connecting links before and after being modified by the overlapping object and object-connecting tools.
Figure 43:
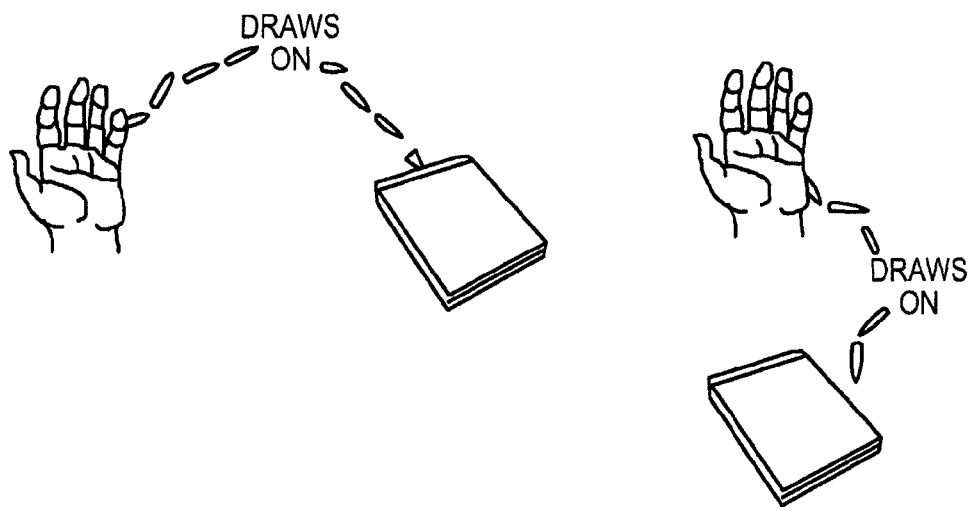
Figure 44:

The above-described overlapping object tool and object-connecting tool can be integrated to provide enhanced functionality. In particular when integrated, the overlapping object and object-connecting tools provide for the automatic positioning of overlapping visual objects and the precise connection of visual objects with connecting links whether shaped or not. FIGS. 42 to 45 show examples of concept maps including visual objects joined by connecting links before and after being modified by the integrated overlapping object and object-connecting tools. In FIG. 42, the connecting link extending between the visual objects is extended by the object-connecting tool so that the connecting link extends fully between the visual objects. In FIG. 43, the visual objects and shaped connecting link are automatically re-positioned by the overlapping object tool. In FIG. 44, visual objects are automatically placed in an overlapping condition and re-positioned by the overlapping object tool.

Figure 45:
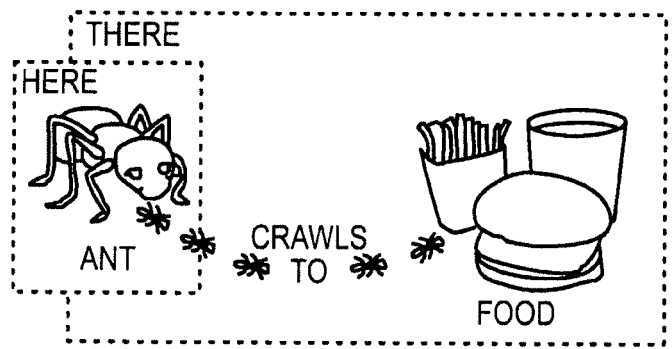

FIG. 45 shows a concept map created using the integrated overlapping object and object-connecting tools. As can be seen, the visual objects representing food have been automatically placed in an overlapping condition by the overlapping object tool. A shaped connecting link extends fully between the visual objects representing food and the visual object representing an ant. The shapes along the shaped connecting link are in the form of small ants representing the crawling action of the visual object representing the ant to the visual objects representing food.

As will be appreciated, the overlapping object and object-connecting tools when integrated allow arbitrarily shaped visual objects to be automatically laid out on top of one another and joined with connecting links that extend fully between the visual objects. The connecting links can be in the form of lines of shortest distance and including one or more arrowheads. The connecting links may also be shaped to provide semantic meaning concerning the connection between the visual objects.

The present invention can be embodied as computer readable program code stored on a computer readable medium. The computer readable medium is any data storage device that can store data, which can thereafter be read by a computer system. Examples of computer readable medium include read-only memory, random-access memory, CD-ROMs, magnetic tape and optical data storage devices. The computer readable program code can also be distributed over a network including coupled computer systems so that the computer readable program code is stored and executed in a distributed fashion.

Although a number of embodiments have been described above, those of skill in the art will appreciate that variations and modifications may be made without departing from the spirit and scope thereof as defined by the appended claims.

What is claimed is:

1. A computerized method of creating a connecting link joining visual objects presented on a display, said method comprising:
   determining a curved path for said connecting link between said visual objects;
   converting said curved path to a plurality of straight line segments; and
   representing said connecting link by placing at least one non-line shape along said straight line segments.

2. Apparatus creating a connecting link joining visual objects presented on a display, comprising:
   one or more processors configured to (i) determine a curved path for said connecting link between said visual objects, (ii) convert said curved path to a plurality of straight line segments; and (iii) represent said connecting link by placing at least one non-line shape along said straight line segments.

3. The method of claim 1 wherein said at least one non-line shape provides information concerning the relationship between said visual objects.

4. The method of claim 3 wherein said connecting link is represented by a plurality of spaced non-line shapes.

5. The method of claim 4 wherein said non-line shapes are generally evenly spaced.

6. The method of claim 4 wherein said non-line shapes are one of the same and different.

7. The method of claim 4 wherein said non-line shapes are generally centered along said path.

8. The method of claim 7 wherein said non-line shapes are one of the same and different.

9. The method of claim 8 wherein said non-line shapes generally span the length of said connecting link.

10. The method of claim 4 comprising animating at least some said non-line shapes.

11. The method of claim 10 wherein said non-line shapes are animated generally continuously.

12. The method of claim 10 wherein said non-line shapes are animated in response to an input event.

13. The method of claim 4 further comprising:
detecting selection of one of said non-line shapes; and
presenting, in response to said selection, a tip on said display.

14. The method of claim 1 wherein said at least one non-line shape generally spans the length of said connecting link.

15. The method of claim 1 comprising associating a sound with said connecting link.

16. The method of claim 15 comprising playing said sound when said connecting link is presented.

17. The method of claim 16 wherein said connecting link is represented by a plurality of spaced non-line shapes.

18. The method of claim 17 comprising playing said sound when one of said non-line shapes is selected.

19. A computing device comprising a processor and memory storing an object-connecting tool for creating a connecting link joining visual objects presented on a display, the object-connecting tool, when executed by the processor, causing the computing device at least to:
determine a curved path for said connecting link between said visual objects;
convert said curved path to a plurality of straight line segments;
represent said connecting link by placing at least one non-line shape along said straight line segments; and
present said connecting link on said display.

20. A computing device according to claim 19 wherein said at least one non-line shape provides information concerning the relationship between said visual objects.

21. A computing device according to claim 19 wherein said connecting link is represented by a plurality of spaced non-line shapes.

22. A computing device according to claim 21 wherein said non-line shapes are generally evenly spaced.

23. A computing device according to claim 21 wherein said non-line shapes are one of the same and different.

24. A computing device according to claim 23 wherein said non-line shapes generally span the length of said connecting link.

25. A non-transitory computer readable medium embodying a computer program for creating a connecting link joining visual objects stored thereon, said computer program comprising:
computer program code for determining a curved path for said connecting link between said visual objects;
computer program code for converting said curved path to a plurality of straight line segments;
computer program code for representing said connecting link by placing at least one non-line shape along said straight line segments: and
computer program code for presenting said connecting link on said display.

* * * * *